Patented June 5, 1945

2,377,761

UNITED STATES PATENT OFFICE 2,377,761

UREA-DIMETHYLOL UREA-CHLORINATED ACETAMIDE RESIN

Gaetano F. D'Alelio, Pittsfield, Mass., assignor to General Electric Company, a corporation of New York No Drawing. Application December 23, 1940, Serial No. 371,395

15 Claims. (Cl. 260—70)

This invention relates to the production of new and useful synthetic compositions. More particularly the invention is concerned with novel synthetic resins obtained by reaction of "a urea" and a preformed poly-(N-carbinol) derivative of "a urea," for example preformed dimethylol urea and thiourea, preformed dimethylol derivatives of substituted ureas and thioureas, etc. By the term "a urea" is meant not only urea itself but also substituted ureas and their equivalents containing at least two active hydrogen atoms, more particularly compounds containing at least one hydrogen atom attached directly to each amide nitrogen, the urea in all cases being free from N-carbinol groupings, more particularly N-methylol groupings. A preformed poly-(N-carbinol) derivative of a urea may be described more definitely as a urea containing at least two N-carbinol groups. An N-carbinol grouping may be described as a radical containing the essential unit

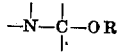

where R represents hydrogen or a monovalent organic radical, more particularly a substituted or unsubstituted hydrocarbon radical. Specifically the invention relates to compositions of matter comprising the product of reaction of (1) a chlorinated acetamide and (2) a partial condensation product of ingredients comprising essentially (a) a urea having at least two hydrogen atoms attached directly to the urea nitrogen and being free from N-methylol groupings and (b) a preformed compound consisting of a urea containing at least two methylol groupings attached directly to the urea nitrogen.

The preparation of resinous materials by effecting reaction between urea, thiourea or a substituted urea or thiourea containing at least one reactive

—NH

=NH or —NH₂ grouping and an aldehyde, e. g., formaldehyde, has been known for many years. Such resins and articles produced therefrom are now being made and used extensively. However, their field of utility has been limited, for one reason because the resistance to water and humidity changes of the ordinary cured resins and molded products has not been entirely satisfactory for many commercial applications. It also has been suggested that resinous compositions might be produced by appropriate heat treatment of preformed mono- or di-methylol urea. However, to the best of my knowledge and belief no resins produced by mere heat treatment of such preformed ureas have had the properties necessary to render them of any commercial value.

The present invention is based on my discovery that resinous products having particularly valuable properties can be produced by effecting reaction between (1) a urea having at least two hydrogen atoms attached directly to the urea nitrogen and being free from N-carbinol, more particularly N-methylol, groupings and (2) a preformed poly-(N-carbinol) derivative of a urea, more particularly a urea having at least two N-methylol groupings, that is, at least two methylol groupings attached directly to the urea nitrogen. The reaction may be carried out under acid, neutral or alkaline conditions, at normal or at elevated temperatures, and at atmospheric, sub-atmospheric or super-atmospheric pressures. These new materials are characterized by their high resistance to water as compared with the ordinary urea-formaldehyde resins. Furthermore, the potentially reactive resinous syrups and molding compounds prepared therefrom have excellent time- or storage-stability, that is, they can be stored for long periods of time without materially advancing toward the insoluble, infusible state. This is a matter of considerable practical importance, since the resin or compound then does not need to be used immediately or very soon after its manufacture nor does it need to be subjected to frequent control tests during storage to determine the extent of any changes that may be taking place in its composition.

I am unable to state with certainty the reason for the unexpected improvement in properties that characterizes resins obtained by reacting to resin formation ingredients comprising essentially a urea and a preformed poly-(N-carbinol) derivative of a urea, as compared with the ordinary resinous condensation products of a urea and an aldehyde, e. g., formaldehyde, especially since many chemists believe that during such urea-formaldehyde resin-forming reaction a methylol derivative of the urea component is formed. However, I believe that the reason for the improvement may be due at least in part to the fact that the reactive —OR groups of the preformed urea containing at least two N-carbinol groups serve as binding anchors between the co-condensing molecules. In other words, the poly-(N-carbinol) derivative functions as a bridging agent between individual molecules of the urea component thereby to obviate the disadvantages characteristic of the individual component.

In order that those skilled in the art better may understand how the present invention may be carried into effect, the following illustrative examples thereof are given. All parts are by weight.

EXAMPLE 1

(A)

|  | Parts | Mols (approximately) |
|---|---|---|
| Urea | 360 | 6 |
| Aqueous solution of formaldehyde (approx. 37.1% HCHO) | 648 | 8 HCHO | were mixed with 292 parts water and heated together at boiling temperature under reflux for 30 minutes. Immediately upon taking the heat away, the clouded mass set to a firm gel. Since such a gelled material obviously could not be utilized in the production of a molding compound, it was discarded.

That the results obtained when a urea is caused to react with a poly-(N-carbinol) derivative of a urea are entirely different from those obtained when reaction is effected between a urea and an aldehyde will be noted by comparing the results of (A) with the following:

(B)

|  | Parts | Mols (approximately) |
|---|---|---|
| Urea | 120 | 2 |
| Dimethylol urea (preformed) | 480 | 4 | were mixed with 600 parts water and heated at boiling temperature under reflux for 30 minutes. A slightly cloudy solution was obtained. Intercondensation with a chlorinated acetamide, e. g., mono-, di- or tri-chloracetamide, causes the potentially reactive (heat-convertible) resinous syrup rapidly to convert to an insoluble, infusible state when subjected to an elevated temperature, e. g., 100° to 200° C.

A molding (moldable) compound was prepared by mixing together

| | Parts |
|---|---|
| Resin syrup of (B) | 230.0 |
| Curing reactant, specifically chloracetamide | 1.0 |
| Alpha cellulose in flock form | 70.0 |
| Mold lubricant, specifically zinc stearate | 0.4 | followed by drying the wet mixture at 70° C. Simultaneously with drying at least a part of the chloracetamide intercondensed with the resin syrup. The dried compound was molded at 130° C. under a pressure of 2,000 pounds per square inch, yielding well-cured molded pieces that showed good plastic flow during molding. The surface appearance also was very good. The molded article did not disintegrate or show any material change in surface appearance when immersed in boiling water for 15 minutes. On an accelerated test to ascertain its relative resistance to water, it showed only 5.0% water absorption. (The water absorption is determined by immersing a weighed sample of the molded article for 15 minutes in boiling water, immersing immediately in cold water for 5 minutes, after which the sample is wiped dry, weighed immediately and the percentage increase in weight recorded as the per cent water absorbed.)

EXAMPLE 2

(A)

|  | Parts | Mols (approximately) |
|---|---|---|
| Urea | 300 | 5 |
| Aqueous solution of formaldehyde (approx. 37.1% HCHO) | 648 | 8 HCHO | were mixed with 232 parts water and heated together under reflux at boiling temperature for 30 minutes. Early during the process of refluxing, the solution became exceedingly cloudy. On cooling a small sample of the solution to room temperature it gelled.

A molding compound and molded articles were prepared from a portion of the hot resinous syrup as described above with reference to (B) of Example 1. When molded, the dried compound exhibited virtually no plastic flow during molding and yielded a chalky, compressed, only partly cured mass. A thin molded disk showed only 2% light transmission when tested using a double-sphere photometer. The molded piece swelled when immersed for 15 minutes in boiling water. It showed 14.1% water absorption when tested for its resistance to water as described under Example 1.

(B)

|  | Parts | Mols (approximately) |
|---|---|---|
| Urea | 60 | 1 |
| Dimethylol urea (preformed) | 480 | 4 | were mixed with 540 parts water and heated under reflux for 30 minutes at the boiling temperature of the mass. The solution remained clear throughout the entire reflux period, clouding slightly only upon cooling to room temperature. The addition of active or latent curing catalysts or inter-condensation with curing reactants caused the potentially heat-curable, liquid resinous mass to cure to a heat-cured (heat-hardened) state when a small sample of the material was heated on a 140° C. hot plate.

A molding compound and molded articles were prepared as described under (B) of Example 1. The compound had good time stability and the molded articles were well cured throughout and of excellent appearance. The high translucency of thin molded disks of this compound is evidenced by the fact that such a disk showed 23% light transmission as compared with only 2% for the (A) product of this example. The molded article successfully withstood immersion in boiling water for 15 minutes. Its water-absorption value was only 4.82% as compared with 14.1% for the molded piece of (A).

EXAMPLE 3

(A)

|  | Parts | Mols (approximately) |
|---|---|---|
| Urea | 420 | 7 |
| Aqueous solution of formaldehyde (approx. 37.1% HCHO) | 972 | 12 HCHO | were mixed with 168 parts water and heated under reflux at boiling temperature for 30 minutes. Early during the reflux period, solid resinous material was precipitated from solution so that a very cloudy suspension formed.

A molding compound and molded articles were prepared as described under (B) of Example 1. The molded articles showed little evidence of plastic flow during molding and their general appearance and properties were much the same as the products of (A) of Example 2. A thin molded disk showed only 2% light transmission. The water absorption of a molded piece was 15.3%.

The addition of active or latent curing catalysts or of curing reactants to the resin syrup or to the molding composition of (A) of both this example and of Example 2 did not improve the curing characteristics of the compositions and, in many cases, made them worse.

(B)

|  | Parts | Mols (approximately) |
|---|---|---|
| Urea | 60 | 1 |
| Dimethylol urea (preformed) | 720 | 6 | were mixed with 780 parts water and heated under reflux for 30 minutes at boiling temperature to yield a clear solution. The addition of active or latent curing catalysts or inter-condensation with curing reactants caused the heat-hardenable resinous syrup to convert to a heat-set, insoluble and infusible state when a small sample was heated on a 140° C. hot plate.

A molding compound prepared as described under (B) of Example 1 yielded cured molded articles of excellent appearance when the dried compound was molded at about 130° C. under a pressure of 2,000 pounds per square inch. The molded pieces were not attacked when immersed in boiling water for 15 minutes. The water absorption was only 5.14%, as compared with 15.3% for the product of (A) of this example. A thin molded disk showed a light-transmission value of 22% as compared with 2% for the (A) product.

It will be noted that in each of the above examples the proportions of reactants are such that if all the formaldehyde shown in the (A) parts of the examples combined with a portion of the urea to form dimethylol urea in situ, the proportions of such dimethylol urea and of the remaining urea then would be substantially the same as the proportions of urea and preformed dimethylol urea shown in the (B) parts of the examples. From a comparison of the results obtained it is clear that, if dimethylol urea does form when urea and formaldehyde are caused to react as described in the (A) parts of the examples, such dimethylol urea is not the equivalent of the preformed dimethylol urea employed as a reactant in forming the resins and thermosetting molding compositions described in the (B) parts of the examples. This will be seen at once from a comparison of the data on the (A) and (B) products shown in Table I.

TABLE I

| Example | pH of solution | | Tests on molded pieces | | |
|---|---|---|---|---|---|
|  | After mixing and before refluxing | After refluxing | Per cent water absorption | Per cent light transmission | Cure |
| 1-A | 4.50 | (¹) | | | |
| 1-B | 7.55 | 6.25 | 5.0 | 16 | Well cured. |
| 2-A | 4.38 | 3.68 | 14.1 | 2 | Poorly cured. |
| 2-B | 7.45 | 6.37 | 4.82 | 23 | Well cured. |
| 3-A | 4.35 | 3.65 | 15.3 | 2 | Poorly cured. |
| 3-B | 7.43 | 6.40 | 5.14 | 22 | Well cured. |

¹ Gelled while refluxing.

Another series of tests was made wherein the same proportions of components described under parts (A) and (B) of Examples 1, 2 and 3 were caused to react as described under the individual examples but using 0.1% by weight (of the solids) of an alkaline material, specifically sodium hydroxide, as a condensation catalyst to accelerate the reaction. In each and every case the resin syrups and molding compositions wherein a preformed urea containing at least two N-carbinol groups, specifically preformed dimethylol urea, was used as a reactant with a urea not containing two N-carbinol groups, specifically CO(NH₂)₂, showed better time or storage stability than the syrups and molding compounds comprising the urea-formaldehyde resin. The former molding compounds also showed better plastic flow during molding and yielded molded articles of better appearance and cure characteristics than the latter.

EXAMPLE 4

|  | Parts | Mols (approximately) |
|---|---|---|
| Phenyl thiourea (C₆H₅NHCSNH₂) | 152 | 1.0 |
| Dimethylol urea (preformed) | 270 | 2.25 | were mixed with 180 parts water and then heated under reflux at boiling temperature for 20 minutes. A very viscous resin precipitated from solution, which resin bodied on a 140° C. hot plate to a clear, colorless, tough, infusible resin without the addition of any active or latent curing catalyst or a curing reactant. This resin showed outstanding hydrophobic qualities.

EXAMPLE 5

|  | Parts | Mols (approximately) |
|---|---|---|
| Thiourea | 76.0 | 1.0 |
| Dimethylol urea (preformed) | 270.0 | 2.25 |
| Sodium hydroxide in 10 parts water | 0.2 |  | were mixed with 290 parts water and thereafter heated under reflux for 30 minutes at boiling temperature. The resulting syrup was clear and colorless. When a small sample was heated on a 140° C. hot plate, the syrup bodied to a clear, thermoplastic resin. The addition of active or latent curing catalysts to the syrupy partial condensation product, or incorporating therein a curing reactant such as chloracetamide, followed by heating on a 140° C. hot plate, resulted in hard, infusible resins. A molding compound was prepared as described under (B) of Example 1 with the exception that intercondensation of the chloracetamide with the resin syrup was effected by heating the chloracetamide-containing syrup for 5 minutes at boiling temperature under reflux before mixing with the filler (alpha cellulose) and zinc stearate. Well-cured molded articles were obtained from the dried compound when it was molded at 130° C. under a pressure of 2,000 pounds per square inch.

It will be understood, of course, by those skilled in the art that my invention is not limited to the specific components named in the above illustrative examples. Thus, instead of urea, thiourea or phenyl thiourea, I may use any other substituted urea or its equivalent containing at least two active hydrogen atoms, more particularly compounds containing at least one hydrogen atom attached directly to each amide nitrogen. Thus I may use, for example, alkyl urea and thioureas (e. g., methyl, ethyl, etc., ureas and thioureas), aryl ureas and thioureas (e. g., phenyl urea and thiourea, unsymmetrical diphenyl urea and thiourea, etc.), alkyl aryl ureas and thioureas (e. g., unsymmetrical methyl phenyl urea and thiourea, unsymmetrical ethyl phenyl urea and thiourea, etc.), hydroxy urea and thiourea, ethanol urea and thiourea, acetyl urea and thiourea, benzoyl urea and thiourea, allyl urea and thiourea, 2-chlorallyl urea and thiourea, di-(phenyl sulfonamide) ureas and thioureas, guanyl urea and thiourea, guanidine, biguanide, aminoguanidine, dicyandiamide, etc. In many cases other compounds, e. g., aminodiazines, aminotriazines, aminodiazoles, etc., advantageously may be substituted for at least a part of the urea component. For example, a substantial part of the urea may be replaced by an aminotriazine, e. g., melamine, ammeline, ammelide or other aminotriazines, numerous examples of which are given in various copending applications of mine, for instance in copending application Serial No. 359,719, filed October 4, 1940, and assigned to the same assignee as the present invention.

Instead of preformed dimethylol urea shown in the above illustrative examples, other preformed poly-(N-carbinol) derivatives of a urea may be employed, more particularly compounds of the general formula preformed poly-(N-methylol) ureas.

If condensation catalysts are employed to accelerate the condensation reaction between the components, I prefer to use an alkaline or basic condensing agent. Condensation products having excellent storage-stability characteristics can be obtained by causing the condensation reaction to take place in the presence of a condensation catalyst comprising a primary condensation agent and a secondary condensation agent. As the primary catalyst advantageously may be used a member of the class consisting of nitrogen-containing basic compounds, e. g., ammonia, primary amines (e. g., ethyl amine, propyl amine, etc.), secondary amines ( e. g., dipropyl amine, dibutyl amine, etc.) and tertiary amines such as trialkyl (e. g., trimethyl, triethyl, etc.) amines, triaryl (e. g., triphenyl, etc.) amines, etc. The secondary condensation catalyst, which ordinarily is used in an amount less than the amount of the primary catalyst, should be a fixed alkali, for instance a carbonate, cyanide or hydroxide of an alkali metal (e. g., sodium, potassium, lithium, etc.). Thus, resinous products of exceptional storage stability may be obtained by causing the initial condensation reaction to be carried out in the presence of a condensation catalyst comprising a relatively small amount of ammonia and a lesser but substantial amount of a fixed alkali, specifically sodium or potassium hydroxide.

In producing my new compositions of matter comprising a reaction product of ingredients comprising essentially a urea and a preformed poly-(N-carbinol) derivative of a urea, the ratio between the components may be considerably varied but, in general, it is desirable to use at least one mol of the poly-(N-carbinol) derivative for each mol of urea or substituted urea employed. Advantageously I effect reaction between a urea and a preformed poly-(N-carbinol) derivative of a urea, specifically preformed dimethylol urea, in the ratio of one mol of the former to from 1.5 to 8 mols of the latter, optimum results being obtained with from 2 to 6 mols of the latter for each mol of the former. A preferred method of preparing the new compositions of matter of this invention comprises forming a partial condensation product of ingredients comprising essentially urea and preformed dimethylol urea in the presence of a condensation catalyst comprising ammonia and a fixed alkali, and completing the condensation reaction between the said ingredients in the presence of a curing reactant, specifically a curing reactant comprising chloracetamide.

The properties of the fundamental resins of this invention may be varied widely by introducing other modifying bodies before, during or after effecting condensation between the primary components. Thus, as modifying agents I may use, for instance, monohydric alcohols such as ethyl, propyl, isopropyl, butyl, amyl, etc., alcohols; polyhydric alcohols such as ethylene glycol, diethylene glycol, glycerine, pentaerythritol, etc., amides such as formamide, acetamide, stearamide, acrylamide, benzamide, toluene sulfonamide, benzene disulfonamide, benzene trisulfonamide, adipic diamide, phthalamide, etc., amines such as ethylene diamine, aniline, phenylene diamine, etc.; phenols; aminophenols; ketones; nitriles, e. g., acrylonitrile, methacrylonitrile, succinonitrile, etc.; and others.

The modifying bodies also may take the form of high molecular weight bodies with or without resinous characteristics, for example hydrolyzed wood products, formalized cellulose derivatives, lignin, proteins, protein-aldehyde condensation products, aminodiazine- and aminotriazine-aldehyde condensation products, phenol-aldehyde condensation products, aniline-aldehyde condensation products, modified or unmodified, saturated or unsaturated polyhydric alcohol-polybasic acid condensation products, sulfonamide-aldehyde resins, N-carbinol derivatives of aminotriazines, e. g., the methylol melamines, more particularly mono-, di-, tri-, tetra-, penta- and hexamethylol melamines, water-soluble cellulose derivatives, natural gums and resins such as shellac, rosin, etc.; polyvinyl compounds such as polyvinyl alcohol, polyvinyl acetate, polyvinyl acetals, specifically polyvinyl formal, synthetic linear condensation products such as the superpolyamides, etc. The synthetic compositions of this invention also may be used as modifiers of, or may be modified by, the synthetic compositions disclosed and claimed in various copending applications of mine, for example in copending application Serial No. 371,393 and Serial No. 371,394, which applications were filed December 23, 1940, have now matured into Letters Patent Nos. 2,328,424 and 2,328,425, respectively, issued August 31, 1943, and are assigned to the same assignee as the present invention. More specifically, the compositions of this invention may be used in the form of mixtures with, for example, a condensation product of preformed dimethylol urea and an aminotriazine, e. g., melamine, or a condensation product of preformed dimethylol urea and trimethylol melamine, or with both such condensation products.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide molding compositions best fitted to yield molded articles of optimum properties for the particular service application.

The molding compositions of this invention may be molded into a wide variety of shapes under heat or under heat and pressure, more particularly at temperatures of the order of 100° to 200° C. For optimum results I prefer to use temperatures ranging from approximately 120° to 160° C. Molding pressures may be varied considerably, but usually are within the range of 1,000 to 10,000 pounds per square inch, more particularly from 2,000 to 4,000 or 5,000 pounds per square inch.

The modified and unmodified resinous compositions of this invention have a wide variety of uses. For example, in addition to their use in the production of molding compositions, they may be used as laminating varnishes in the production of laminated articles wherein sheet materials, e. g., paper, cloth, sheet asbestos, etc., are coated and impregnated with the resin, superimposed, and thereafter united under heat and pressure. They also may be used in the production of wire or baking enamels, and for binding or cementing together mica flakes to make a laminated mica article. They are particularly useful as fire retardants and sizings for cotton, linen and other cellulosic materials. They also may be used as impregnants for electrical coils. The cured products have excellent resistance to heat and water and have a high dielectric strength.

What I claim as new and desire to secure by Letters Patent of the United States is:

1. A composition of matter comprising the product of reaction of (1) a chlorinated acetamide and (2) a partial condensation product of ingredients comprising essentially (a) a urea having at least two hydrogen atoms attached directly to the urea nitrogen and being free from N-methylol groupings and (b) a preformed compound consisting of a urea containing at least two methylol groupings attached directly to the urea nitrogen.

2. A composition of matter comprising the resinous product of reaction of (1) a chlorinated acetamide and (2) a partial condensation product of ingredients comprising preformed dimethylol urea and a urea having at least two hydrogen atoms attached directly to the urea nitrogen and being free from N-methylol groupings.

3. A synthetic resinous composition comprising the product of reaction of (1) a chlorinated acetamide and (2) a partial condensation product of ingredients comprising (a) a preformed compound consisting of a urea having at least two methylol groupings attached directly to the urea nitrogen and (b) a urea having at least two hydrogen atoms attached directly to the urea nitrogen and being free from N-methylol groupings, said components of (2) being present in the ratio of one mol of the compound of (a) to at least one mol of the compound of (b).

4. A heat-curable composition comprising a heat-convertible resinous product of reaction of (1) a chlorinated acetamide and (2) a potentially reactive condensation product of ingredients comprising urea and preformed dimethylol urea in the ratio of one mol of the former to from 1.5 to 8 mols of the latter.

5. A product comprising the heat-cured composition of claim 4.

6. The resinous reaction product of (1) a partial condensation product of ingredients comprising urea and preformed dimethylol urea in the ratio of one mol of the former to from 1.5 to 8 mols of the latter and (2) a chlorinated acetamide.

7. The resinous reaction product of (1) a partial condensation product of ingredients comprising thiourea and preformed dimethylol urea in the ratio of one mol of the former to from 1.5 to 8 mols of the latter and (2) a chlorinated acetamide.

8. The resinous reaction product of (1) a partial condensation product of ingredients comprising thiourea and preformed dimethylol urea in the ratio of one mol of the former to approximately 2.25 mols of the latter and (2) chloracetamide.

9. A composition comprising the resinous product of reaction of (1) a chlorinated acetamide with (2) an alkaline-catalyzed partial condensation product of ingredients comprising essentially (a) a urea having at least two hydrogen atoms attached directly to the urea nitrogen and being free from N-methylol groupings and (b) preformed dimethylol urea.

10. A composition comprising the resinous product obtained by reaction of (1) a chlorinated acetamide and (2) a partial condensation product of ingredients comprising urea and preformed dimethylol urea in the ratio of one mol of the former to approximately two mols of the latter and in the presence of a condensation catalyst comprising ammonia and a fixed alkali.

11. A product comprising the reaction product of (1) chloracetamide with (2) a potentially reactive resinous condensation product of urea and preformed dimethylol urea in the ratio of one mol of the former to from 1.5 to 8 mols of the latter.

12. A heat-hardenable molding composition comprising a cellulosic filler and the heat-curable resinous product of reaction of (1) a chlorinated acetamide and (2) a potentially reactive condensation product of urea and preformed dimethylol urea in the ratio of one mol of the former to from 2 to 6 mols of the latter.

13. An article of manufacture comprising the heat-hardened molding composition of claim 12.

14. The method of preparing new synthetic compositions which comprises forming a partial condensation product of ingredients comprising essentially (1) a urea having at least two hydrogen atoms attached directly to the urea nitrogen and being free from N-methylol groupings and (2) a preformed compound consisting of a urea containing at least two methylol groupings attached directly to the urea nitrogen, and causing a chlorinated acetamide to intercondense with the said partial condensation product.

15. The method of preparing new compositions of matter which comprises forming a partial condensation product of ingredients comprising essentially urea and preformed dimethylol urea in the presence of a condensation catalyst comprising ammonia and a fixed alkali, and completing the condensation reaction between the said ingredients in the presence of a curing reactant comprising chloracetamide.

GAETANO F. D'ALELIO.

CERTIFICATE OF CORRECTION.

Patent No. 2,377,761.                                              June 5, 1945.

GAETANO F. D'ALELIO.

It is hereby certified that error appears in the printed specification of the above numbered patent requiring correction as follows: Page 4, first column, lines 56 and 57, strike out the words "compounds of the general formula"; and that the said Letters Patent should be read with this correction therein that the same may conform to the record of the case in the Patent Office.

Signed and sealed this 25th day of September, A. D. 1945.

(Seal)                                First Assistant Commissioner of Patents.

(2) a preformed compound consisting of a urea containing at least two methylol groupings attached directly to the urea nitrogen, and causing a chlorinated acetamide to intercondense with the said partial condensation product.

15. The method of preparing new compositions of matter which comprises forming a partial condensation product of ingredients comprising essentially urea and preformed dimethylol urea in the presence of a condensation catalyst comprising ammonia and a fixed alkali, and completing the condensation reaction between the said ingredients in the presence of a curing reactant comprising chloracetamide.

GAETANO F. D'ALELIO.

CERTIFICATE OF CORRECTION.

Patent No. 2,377,761.    June 5, 1945.

GAETANO F. D'ALELIO.

It is hereby certified that error appears in the printed specification of the above numbered patent requiring correction as follows: Page 4, first column, lines 56 and 57, strike out the words "compounds of the general formula"; and that the said Letters Patent should be read with this correction therein that the same may conform to the record of the case in the Patent Office.

Signed and sealed this 25th day of September, A. D. 1945.

(Seal)              First Assistant Commissioner of Patents.